US008164442B2

(12) United States Patent
Ungari (10) Patent No.: US 8,164,442 B2
(45) Date of Patent: Apr. 24, 2012

(54) INTERACTIVE MAP FOR DISPLAYING REMOTE USER LOCATION AND SUPPLEMENTAL INFORMATION

(75) Inventor: Joseph Ungari, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 635 days.

(21) Appl. No.: 12/358,201

(22) Filed: Jan. 22, 2009

(65) Prior Publication Data

US 2010/0182145 A1 Jul. 22, 2010

(51) Int. Cl.
*G08B 1/00* (2006.01)
*G06F 3/041* (2006.01)
*G06F 3/045* (2006.01)
*G06F 3/033* (2006.01)
*H04W 24/00* (2009.01)
*H04M 11/04* (2006.01)

(52) U.S. Cl. .................. 340/539.13; 345/173; 345/174; 715/863; 455/456.3; 455/404.1

(58) Field of Classification Search ............. 340/539.13; 715/863; 455/456.3
See application file for complete search history.

(56) References Cited

U.S. PATENT DOCUMENTS

| | | | | |
|---|---|---|---|---|
| 6,720,956 | B1 * | 4/2004 | Honma et al. | 345/174 |
| 2009/0191840 | A1 * | 7/2009 | Piett et al. | 455/404.1 |
| 2010/0023895 | A1 * | 1/2010 | Benko et al. | 715/863 |
| 2010/0093373 | A1 * | 4/2010 | Olsson et al. | 455/456.3 |
| 2010/0234046 | A1 * | 9/2010 | Wood | 455/456.3 |

OTHER PUBLICATIONS

"Global Imagination—Creators of the Dynamic and Interactive Planet Video Globe," http://www.globeimagination.com/index.html [Last Accessed Jun. 3, 2010], 2 pages.
"Interactive Talking Globe, Gray Base," National Geographic Society, http://shop.nationalgeographic.com/ngs/browse/productDetail.jsp?productId=79699&categoryId=A096&addFacet=9004:A096&navAction=jump&itemID=936&itemType=PRODUCT [Last Accessed Jun. 3, 2010] 5 pages.
"Video: Microsoft's Sphere display in action," Seattle pi Blogs, http://blog.seattlepi.com/microsoft/archives/144629.asp [Last Accessed Jun. 3, 2010], 10 pages.
"Whrrl—Are You In? Check in to Join Societies," http://whrrl.com/home [Last Accessed Jun. 3, 2010], 1 page.
Honan, Mathew, "I Am Here: One Man's Experience With the Location-Aware Lifestyle," Wired Magazine, http://www.wired.com/gadgets/wireless/magazine/17-02/lp_guineapig?currentPage=all [Last Accessed Jun. 3, 2010], Jan. 19, 2009, 5 pages.

* cited by examiner

*Primary Examiner* — George Bugg
*Assistant Examiner* — Jack Wang
(74) *Attorney, Agent, or Firm* — Perkins Coie LLP (57) ABSTRACT

A method and system for displaying location data and supplemental information associated with a remote mobile device uses, e.g., a spherical display device to display a map of the world or a specific region. The system receives location data from a remote mobile device and displays the location indicated by the location data. The display system may be configured to display a route traveled by the mobile device being tracked by visually connecting multiple locations. The display system may also display supplemental information associated with the map, including points of interest in the area nearby a remote device and information provided by the remote device.

27 Claims, 8 Drawing Sheets

INTERACTIVE MAP FOR DISPLAYING REMOTE USER LOCATION AND SUPPLEMENTAL INFORMATION

BACKGROUND

In today's highly mobile society, staying in touch can be difficult. Families, in particular, may have a difficult time staying in touch, particularly if one or both parents have jobs that require extensive travel and time away from home. Frequent travel can be especially difficult for maintaining a good parent-child relationship. At the same time, some new technologies are useful to bring families closer together. For example, increased use of mobile devices enables travelers to stay in touch easily while on the road. While in the past a traveler was forced to locate an available landline phone and then make an expensive long distance telephone call, the modern mobile device user is able to "roam" on foreign networks and to use a mobile device at any time to stay in contact with family and friends.

Modern technology also provides new communication formats to keep in touch, such as video conferencing, electronic mail or e-mail, text messaging (such as Short Message Service or SMS messaging), photo, video and/or audio messaging (such as Multimedia Messaging Service or MMS messaging) using the Internet, a mobile telecommunications network, an IP-based telecommunications network (such as VoIP or UMA/GAN), etc. However, it would be useful to have new ways of taking advantage of these connecting technologies to help people maintain contact with family and friends. Further, such ways of keeping in touch can at times feel impersonal or not as rich, such as if one compared an email exchange to a personal meeting.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

A method and system for displaying location data and supplemental information associated with a remote mobile device on a substantially spherical, hemispherical, semispherical, cylindrical, convex or other nonflat display is disclosed (the "display system" or "system"). The system uses a spherical, hemispherical, semispherical, or convex display device to display a map of the world or a specific region. The system receives location data from at least one mobile device and displays the location(s) indicated by the location data. This may include, for example, displaying flashing lights or other visual indicators on the map of the world. One or more remote devices, such as mobile telephones, may be registered with the display system to provide location data as they roam. The remote mobile device may generate location data based on a GPS, GIS or other system at least partially present in the mobile device. Alternatively, location data is generated by the mobile network or by a user of the remote device entering location data. The display system may also be configured to display a route traveled by the mobile device being tracked by visually connecting multiple locations. The display system may also include one or more input devices to enable a user to control the display. For example, the display system may include a touch sensitive input device, which may be separate from the display device or integrated into the spherical display.

The display system may also display supplemental information associated with the map. For example, the display system may be configured to determine one or more points of interest in an area nearby a remote mobile device. The system may then display a visual indicator of these points of interest on the spherical display and provide information associated with the indicator. The display system may also display supplemental information provided by a remote device. A remote device may transmit media, such as video, audio, image, or text, associated with a location to the system. The system then displays the media or a visual indicator of the information on the spherical display.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may incorporate many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used with a detailed description of certain specific examples of the invention. Indeed, certain terms may even be emphasized below; however, any terminology intended to be interpreted in any restricted manner will be overtly and specifically defined as such in this Detailed Description section.

Figure 1:
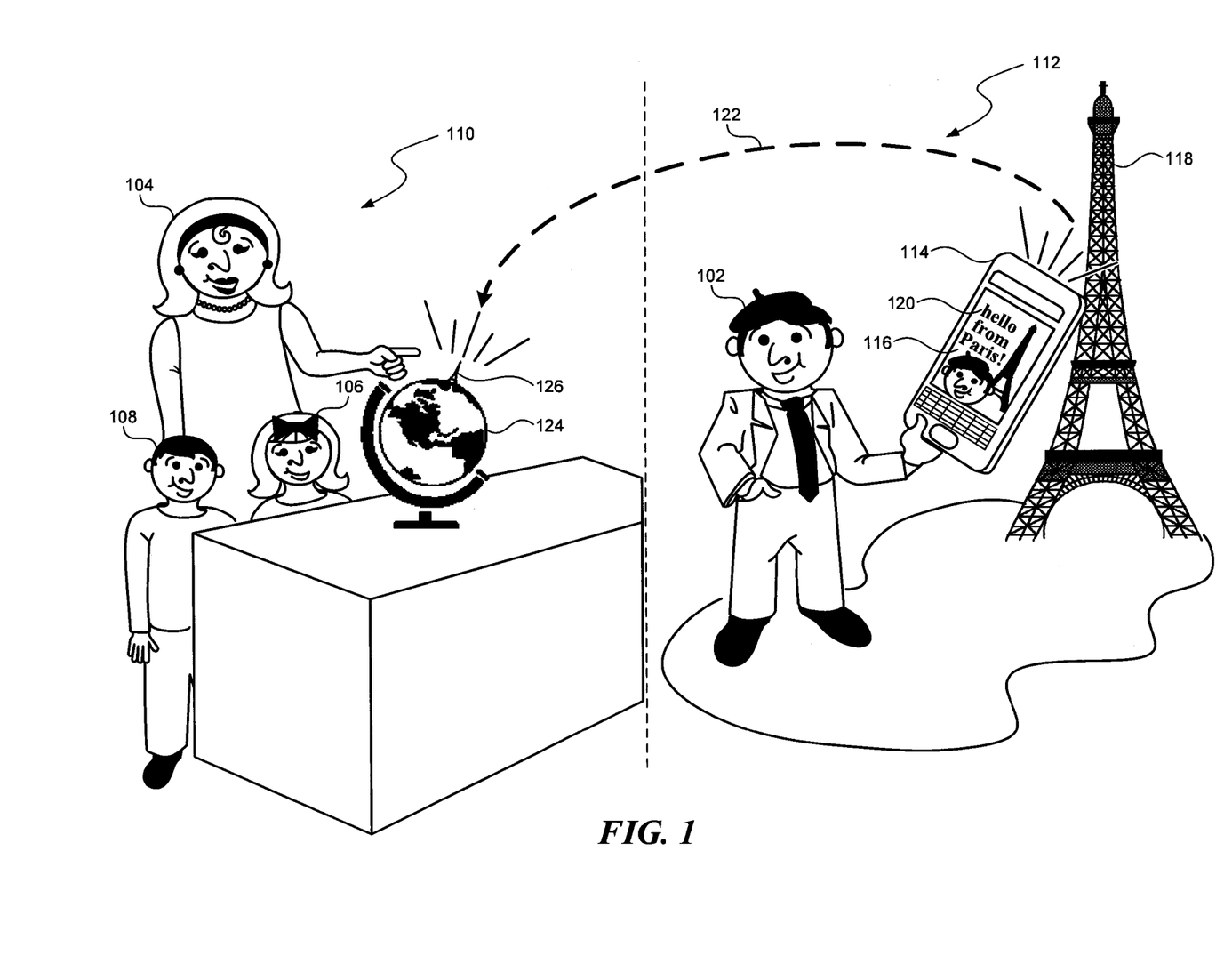
FIG. 1 is an example scenario for using a display system in accordance with one example of the invention.

FIG. 1 is one scenario for using the display system. Members of a family, including a father 102, a mother 104, and children 106 and 108, are shown. The mother 104 and children 106 and 108 are in the family home 110, while the father is traveling in a location 112 away from the family home 110. The father 102 carries with him a mobile device 114, which he has used to take a picture 116 of a landmark 118. As shown on the display of the mobile device 114, the picture 116 includes additional text 120 as a message to the family. The father 102 can then transmit the picture 116, text 120, and other information to the family home 110 via, for instance, a Multimedia Messaging System (MMS) message, using a data connection, such as a mobile cellular network, an IP-based telecommunications network (e.g., a VoIP or UMA/GAN network), or the Internet (indicated by logical connection 122).

The family home 110 includes a display device 124 (in this instance, having a spherical display), which is configured to receive data sent from the mobile device through the data connection 122 and includes a display capable of showing a map and related information to users such as the mother 104 and children 106 and 108. The display device 124 displays an indicator 126 of the current location of the father 102. The indicator 126 may consist of any type of graphical element sufficient to generally identify location, including an LED light, the picture 116, text 120, and other data sent from the mobile device 114.

Figure 2:
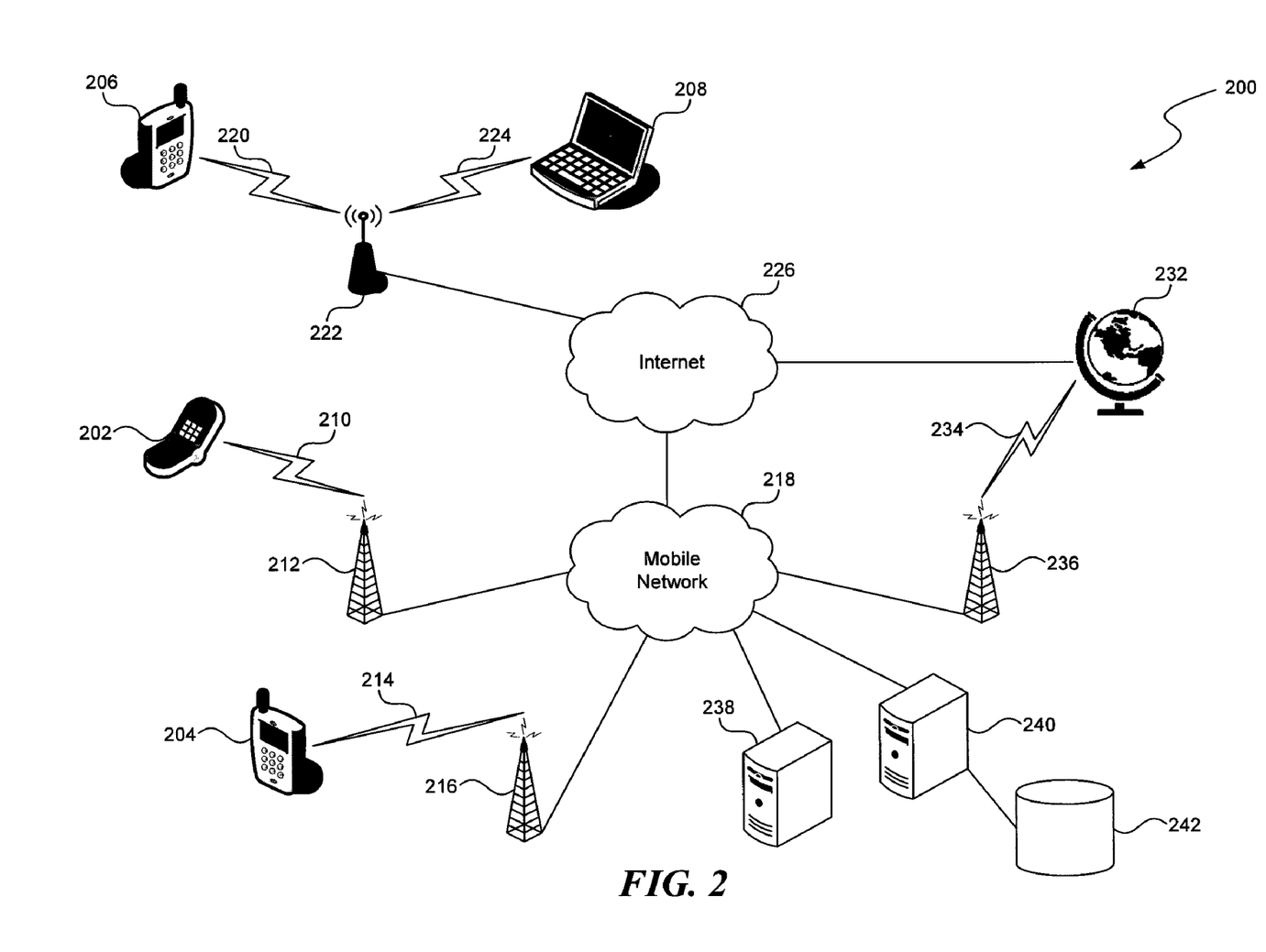
FIG. 2 shows a representative environment in which the display system operates.

FIG. 2 is a network diagram of a representative environment 200 in which the display system operates. The environment 200 includes mobile devices 202, 204, 206 and 208 (in this instance, a basic cellular telephone 202, "smartphone" devices 204 and 206, and laptop computer 208). The mobile device 202 communicates with a cellular network transceiver 212 through a wireless connection 210. Similarly, the mobile device 204 is configured to communicate with a cellular network transceiver 216 through a wireless connection 214. The cellular telephone network may operate at any known standard, such as GSM (Global System for Mobile Communications), (Code Division Multiple Access), UMTS (Universal Mobile Telecommunications System), EDGE (Enhanced Data for GSM Evolution), LTE (Long Term Evolution), WiMAX (Worldwide Interoperability for Microwave Access), Voice Over Internet Protocol (VoIP), Unlicensed Mobile Access (UMA/GAN), and other technologies. Mobile devices include but are not limited to cellular phones, smartphones, multifunctional mobile devices, media players, cameras, computers, etc.

The mobile devices 206 and 208 are configured to communicate with a wireless access point (AP) or hotspot 222 using wireless connections 220 and 224 respectively. The wireless AP 222 may use any known wireless communication protocols, such as IEEE 802.11 or IEEE 802.16, or may be a femtocell or picocell as discussed further below. The mobile device 206 can communicate with the network via the AP 222 via the Unlicensed Mobile Access (UMA) or the Generic Access network (GAN) protocol (as discussed further below). The AP 222 typically has a wireless range that is less than that of cellular network transceivers 212, 216, or 236. The AP 222 is connected to the Internet 226 through standard methods, such as a cable modem, a Digital Subscriber Line (DSL), or a fiber optic connection.

The AP may be implemented as a picocell, which may be communicatively coupled to a base station in the mobile or cellular network. The picocell is a wireless access point typically covering a relatively small area, such as within a building (e.g., office, shopping mall, train station, or the like) or within an aircraft, ship, train or other vehicle. A picocell may, for example, be analogous to a WiFi access point, except that it typically broadcasts using the licensed spectrum of an associated wireless carrier. The picocell serves as an access point for routing communication between the device 204 and the network. One or more picocells may be coupled to a base station controller (BSC) by way of wired or wireless connection.

Alternatively, the Internet or other IP-based network 226, may take the form of a VoIP broadcast architecture (such as UMA or GAN), or a femtocell broadcast architecture. Voice Over Internet Protocol, or VoIP, is a telecommunication system for the transmission of voice over the Internet or other packet-switched networks. Unlicensed Mobile Access or UMA, is the commercial name of the 3GPP Generic Access Network or GAN standard. Somewhat like VoIP, UMA/GAN is a telecommunication system which extends services, voice, data, and IP Multimedia Subsystem/Session Initiation Protocol (IMS/SIP) applications over IP-based networks. For example, a common application of UMA/GAN is in a dual-mode handset service in which device users can seamlessly roam and handover between local area networks and wide area networks using a GSM/Wi-Fi dual-mode mobile phone. UMA/GAN enables the convergence of mobile, fixed and Internet telephony, sometimes called Fixed Mobile Convergence. Femtocells are much like picocells, broadcasting within the licensed spectrum of a wireless telecommunications carrier. Femtocells are typically designed for use in residential or small business environments. Femtocells connect to the service provider's network much like UMA/GAN access points, namely over IP-based networks.

The wireless service provider may track the location of wireless devices, such as mobile devices 202, 204, and 206, using a wide variety of known technologies, such as A-GPS (Assisted GPS), TDOA (Time Difference of Arrival), WiFi triangulation, ATI, Secure User Plane Location (SUPL), or other location-determining technology employing the cellular network transceivers 212 and 216 and/or AP 222 via a location server 238 coupled to the mobile network 218. As a background service, each device may periodically report its GPS coordinates to a wireless network (e.g. via cellular network transceiver 212). Alternatively or additionally, the cellular network transceiver 212 may, with assistance from the wireless device, employ known signal triangulation and/or signal delay techniques to determine a location of each wireless device (e.g. using Time Difference of Arrival (TDOA) methods). For mobile devices operating on an IP-based wireless telecommunications network, such as a VoIP or UMA/GAN network, the wireless service provider may locate a mobile device using a IP-based location methods, including but not limited to those disclosed in WO/2007/121331, entitled "MOBILE COMPUTING DEVICE GEOGRAPHIC LOCATION DETERMINATION" and/or WO/2007/048028, entitled "SYSTEM AND METHOD FOR DETERMINING DEVICE LOCATION IN AN IP-BASED WIRELESS TELECOMMUNICATIONS NETWORK." The location server 238 can provide location data associated with the location of the mobile devices 202, 204, 206, and/or 208 and may store the location data for later use or provide the location data to a separate data server 240 configured to support the display device 232. Alternatively or additionally, the mobile devices themselves may locally generate their location data using a local GPS receiver or other techniques.

The environment 200 also includes a display device 232 configured according to an embodiment of the display system. The display device 232 may be connected to the Internet 226 using a wired or wireless Internet connection technology, such as cable modem or DSL. Alternatively, the display device 232 may use a cellular radio to communicate with a cellular network transceiver 236 using a wireless connection 234. In GSM, GPRS, EDGE, UMTS and/or LTE systems, the display device 232 may incorporate a Subscriber Identity Module or SIM card, which carries an International Mobile Subscriber Identity (IMSI), enabling the display device 232 to access a cellular telecommunications network and/or an IP-based telecommunications network via UMA/GAN.

The display device 232 may receive data from the mobile devices 202, 204, 206 and 208 either directly or indirectly. In one configuration, the display device 232 is configured with a URL, a MSISDN, an International Mobile Subscriber Identity or IMSI, an email address or any other electronic or network address to enable the mobile devices 202, 204, 206, and 208 to communicate directly with the display device 232. In such configurations, display device 232 may receive location data and supplemental information (e.g., photos, videos, audio, etc.) directly from mobile devices 202, 204, 206 and 208 via e-mail, SMS, MMS, or any other messaging format. The mobile devices 202, 204, 206, and 208 may include a local agent present on the device to manage communications. The local agent may gather and locally store location data, detect an available data connection (e.g. IP connection from an AP), and transmit the location data to the display device 232 using a data connection through the mobile network 218, an IP-based telecommunications network (e.g., VoIP or UMA/GAN) or the Internet 226.

The mobile network 218 may also provide a data server 240 to support the functionality of the display device 232. In this configuration, the mobile devices 202, 204, 206, and 208 periodically communicate directly or indirectly with the data server 240 to provide location or supplemental data. The display device 232 maintains a continuous, periodic, or sporadic connection (e.g. using the mobile network 218) with the data server 240 and the data server routes the location and supplemental data to the display device continuously as it becomes available, periodically or sporadically to the data server 240. The data server 240 (or gateway) may also provide access to electronic databases, such as point of interest databases, maps, restaurant reviews, educational databases, etc. The data server may maintain such supplemental information in its own data store 242 or may obtain such supplemental information from one or more other data stores accessible via the mobile network 218 or the Internet 226. The display device 232 may also obtain location data associated with mobile devices 202, 204, 206 and 208 from the location server 238. An advantage of this configuration is that the data server 240 may provide the display device 240 with a more accurate and richer data set than possible with the direct connection. In addition, this configuration enables a single mobile device to provide location data to multiple display devices using a single network connection.

Figure 3:
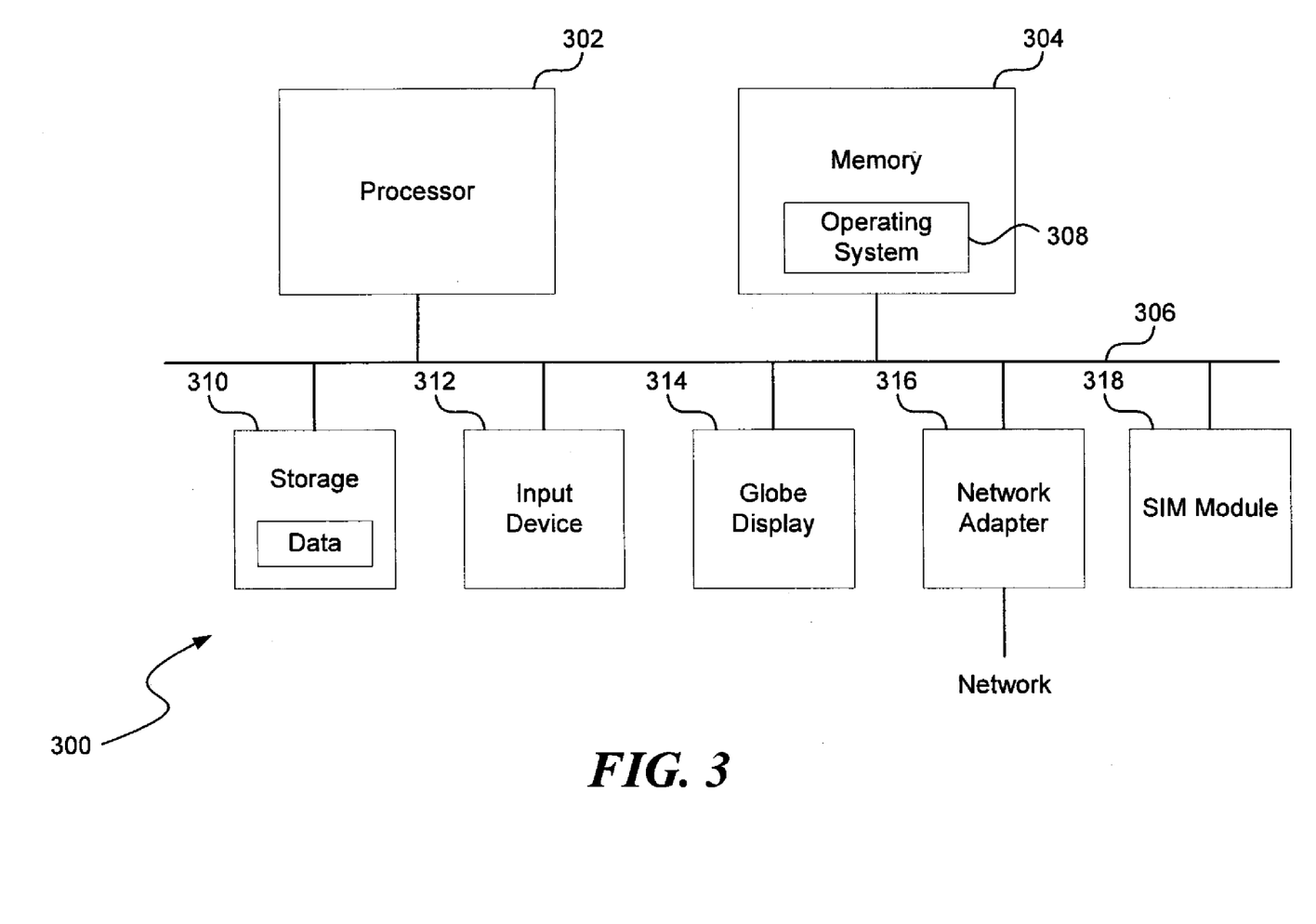
FIG. 3 is a high-level block diagram showing an example of the architecture of a display device.

FIG. 3 is a high-level block diagram showing an example of the architecture of a display device 300. The display device 300 may represent the display device 232 of FIG. 2.

The display device 300 includes one or more processors 302 and memory 304 coupled to an interconnect 306. The interconnect 306 shown in FIG. 3 is an abstraction that represents any one or more separate physical buses, point-to-point connections, or both connected by appropriate bridges, adapters, or controllers. The interconnect 306, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 302 may include central processing units (CPUs) of the display device 300 and, thus, control the overall operation of the display device 300. In certain embodiments, the processor(s) 302 accomplish this by executing software or firmware stored in memory 304. The processor(s) 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 304 is or includes the main memory of the display device 300. The memory 304 represents any form of fixed or removable random access memory (RAM), read-only memory (ROM), flash memory, or the like, or a combination of such devices. In use, the memory 304 stores, among other things, the operating system 308 of the display device 300.

The display device 300 includes an input device 312, which enables a user to control the device. The input device 312 may include a keyboard, mouse, touch-sensitive screen, or other standard computer input device. The display device 300 also includes a display 314 suitable for displaying images on a sphere. The display 314 may be implemented using a spherical projector or other display having a spherical screen. Under at least one example, the touch-sensitive screen is integrated into the display 314. An example of such a touch-sensitive display is the Microsoft Surface product manufactured by Microsoft Corporation of Redmond, Wash. A network adapter 316 is also connected to the processor(s) 302 through the interconnect 306. The network adapter 314 provides the display device 300 with the ability to communicate with remote devices over a network. For instance, the network adapter may be an Ethernet adapter, an RJ-11 port, a wireless transceiver, etc. In GSM, GPRS, EDGE, UMTS, LTE and related embodiments, the display device 300 additionally includes a Subscriber Identity Module or SIM card 318 carrying an International Mobile Subscriber Identity or IMSI, enabling the display device 300 to access a cellular telecommunications network and/or an IP-based telecommunications network such as UMA/GAN. The display device 300 may further include local storage 310 coupled to the interconnect 306.

Figure 4:
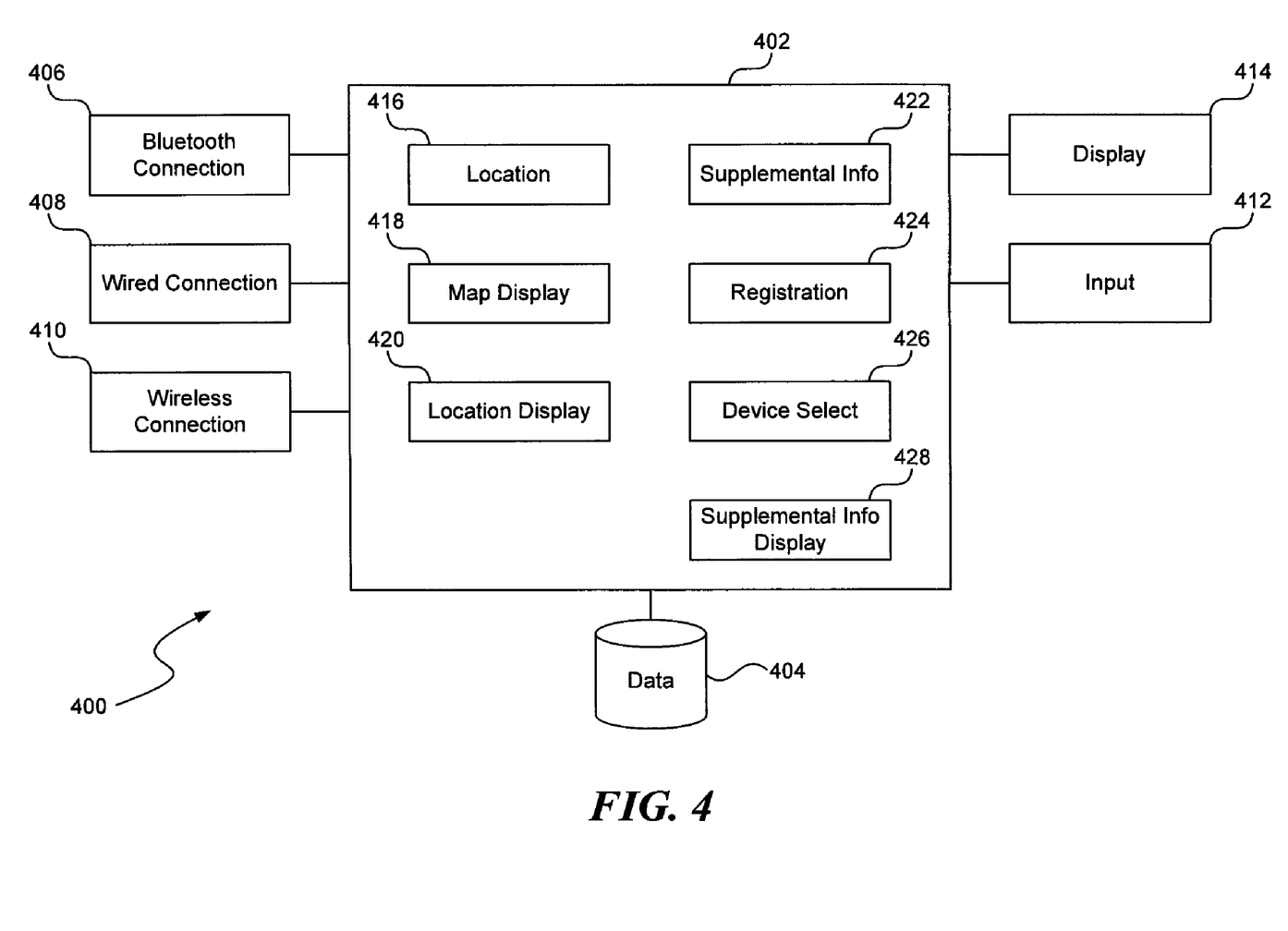
FIG. 4 is a logical block diagram of the display system shown in FIG. 3.

FIG. 4 is a logical block diagram of the display system 400. The system 400 may be executed, for example, using the memory and processor of FIG. 3. Although the various modules are depicted in a single device, the modules are not necessarily physically co-located. In some embodiments, the various modules may be distributed over multiple physical devices. For example, the processing modules may be located in the display device 232 or in a data server 240 provided by the mobile network 218. Similarly, the data storage could be implemented using local storage components, such as a hard drive or flash memory, or using remote storage, such as a web server accessible through the Internet. The code to support the functionality of this system may be stored on a computer-readable medium such as an optical drive, flash memory, or a hard drive. Aspects of the system 400 may be implemented as software, firmware, hardware, or as a combination of these.

The system 400 includes a processing component 402, which is configured to perform the location and display steps carried out by the display system. The processing component 402 is connected to a data storage component 404, which stores configuration and settings information used by the processing component 402. In particular, the storage component 404 stores identifying information used to associate the system 400 with one or more mobile devices that can be tracked by the system 400. The processing component 402 is also connected to one or more networking components. The networking components include a Bluetooth connection component 406, which enables the system 400 to connect to other local computing devices, such as a local mobile device, using the Bluetooth wireless standard. The processing component 402 is also connected to a wired connection 408, such as an Ethernet adapter, and a wireless connection 410. The wireless connection 410 may include, for example, a cellular modem configured to connect the system 400 to a cellular wireless network 218 such as GSM, CDMA, GPRS, EDGE, UMTS, WiMAX, LTE, etc. Alternatively, the wireless connection may be implemented using unlicensed wireless technologies such as IEEE 802.11. The system 400 may also include other communications components, such as a Radio Frequency Identification (RFID) reader. The RFID reader may be used by the system 400 to identify when a particular user of the system 400 comes within range. In this case, each user could have an individual RFID tag associated with them. The system, on detecting the individual's RFID tag, could then load user data from the data storage component 404 based on an index stored on the tag.

The processing component 402 is also connected to an input component 412 that is configured to receive user input through an input device 312. The processing component also connects to a display component 414, which is configured to control the display 314 as directed by the processing component 402. If the processing component 402 is implemented by a network server, the input component 412 and the display component 414 may be communications components configured to communicate using a data network with input and display components of a display device present in a consumer premises.

The processing component 402 includes a location component 416, which is configured to receive location data associated with one or more remote devices, such as the mobile devices 202, 204, 206, and 208 (FIG. 2). As discussed above, the location data may be received directly from the remote device or from another source, such as the location server 238.

The processing component 402 also includes a map display component 418, which is configured to provide a selected map or portion of a map for display by the display component 414. For example, the map display component 418 may be configured to display a map of the world initially. The map display component may also be configured to change the map display in response to magnify, minimize, and move commands received through the input component 412. The processing component 402 also includes a location display component 420, which is configured to control the display component 414 to display a location indicator on the map based on the location data received from the location component 416.

The processing component 402 may include a supplemental information component 422, which is configured to receive or generate supplemental information to display. Supplemental information may include points of interest located near to the remote device location provided by the location component 416. To generate this information, the supplemental information component 422 may use a point of interest database, or a reference database, such as an encyclopedia, to find points of interest. The system may also display additional information associated with a point of interest in response to a user command. The supplemental information may be useful, for example, as an educational tool for children using the display device. A child using the device to track a parent's travels might be prompted to learn more about geography or historical events in the area near the parent's current location. In response to a command from the child, the display device may provide video, audio, photographs, or text to elaborate or may direct the child to other resources. Thus, the display device provides a mechanism to raise a child's interest in the information by associating it with a parent's travels.

The supplemental information component 422 may also be configured to receive supplemental information directly from a remote device, such as the mobile devices 202, 204, 206, and 208. As described above, a user of the remote device may use the device to generate media, such as images, video, audio, or text. The user may then use a network connection to send the media to the display system 400. The supplemental information component 422 associates the received media with a location and provides the information to the supplemental information display component 428 for display. As with the location display component 420, the supplemental information display component 428 controls the display component to display the supplemental information or an indication of the supplemental information at a specified location. The location may be selected based on a current location of the remote device, or may be based on a location selected by the user of the remote device. Thus, a remote user could take a picture in Paris but not transmit it to the display system 400 until after arriving in Berlin. In that case, the user might elect to associate the picture with the Paris location, rather than the current location of Berlin.

The processing component 402 also includes a registration component 424, which is configured to register one or more remote devices to be tracked by the display system 400. The registration component 424 is used to establish or change a relationship between the remote device and the display system 400 to enable the remote device to provide location data to the system 400. The details of the registration process are discussed below with reference to FIG. 6. In some configurations, the system may limit the number of remote devices that can be registered to a small number, such as ten or fewer. This is useful to limit the system to consumer use and may enable the system to be built with less expensive components.

The processing component 402 also includes a device select component 426, which enables the system 400 to select a device from the set of registered devices to display on the display. The device select component 426 may be configured to select a device based on user input received through the input component 412. The device select component 426 may also receive selection information from a local mobile device connected to the system through the Bluetooth connection component 406. In this case, the system 400 might receive settings information from the local mobile device selecting one or more remote mobile devices of interest.

The system 400 may also be configured to support multiple users with different settings for each user. For example, the system 400 may store a first group of registered devices associated with a first user and a second group of devices associated with a second user. The device selection component 426 may then allow a user to select only from devices associated with that user. If a user has only a single associated device, the device selection component 426 may automatically select that device when the user signs on to the system 400.

Figure 5:
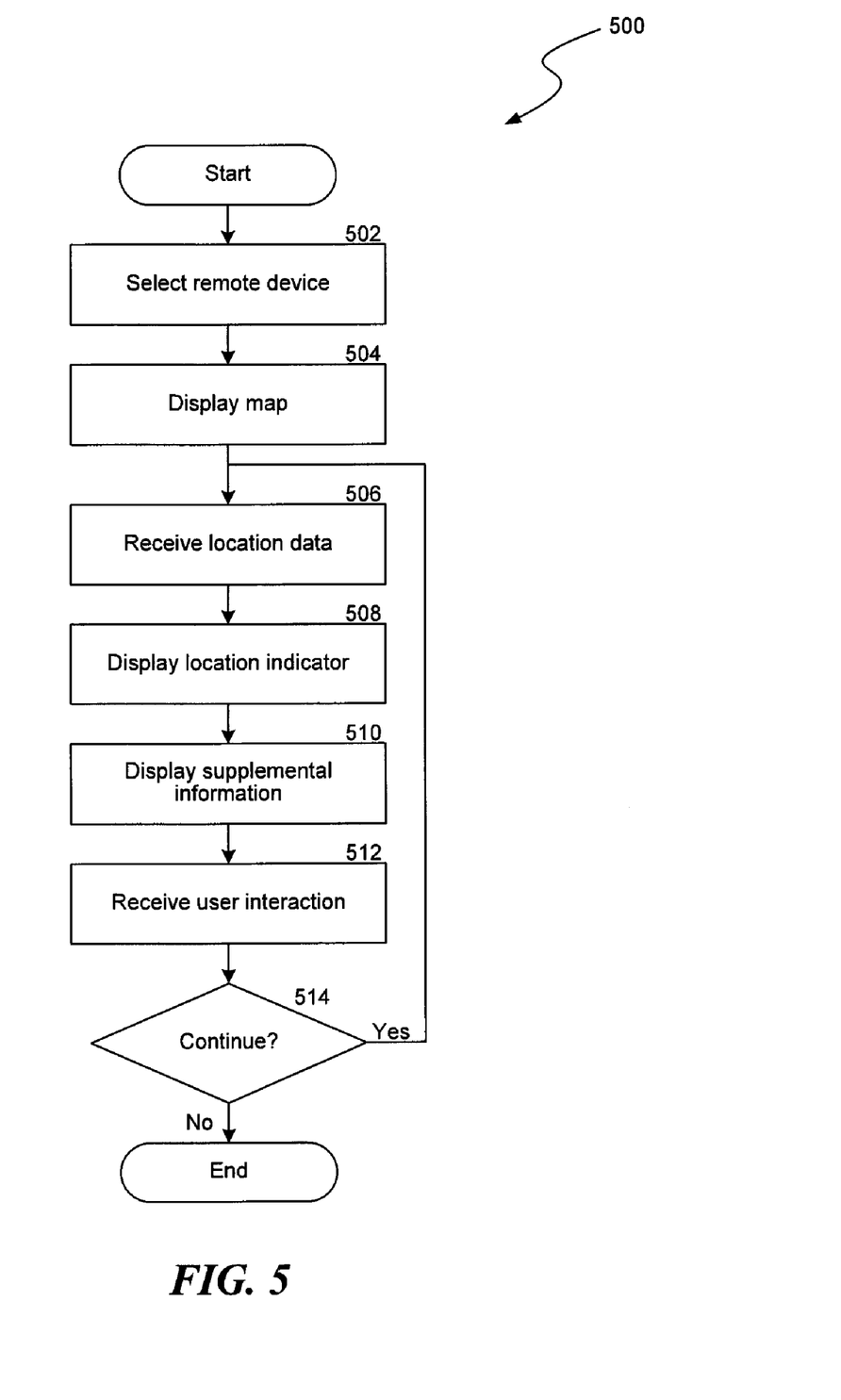
FIG. 5 is a flow chart of a process for implementing the display system of FIG. 3.

FIG. 5 is a flow chart of a process 500 for implementing the display system. The process begins at block 502, where the system selects a remote mobile device to display using a method such the methods discussed above. After selecting a remote device, the system proceeds to block 504, where it displays a map on the display device. The system may select a map to display based on a preconfigured default or may be configured to display a previously displayed map. For example, the system may have a default setting of displaying a world map on startup. After displaying the map on the display device, the system proceeds to block 506, where it receives location data associated with the remote device. As discussed above, the location data may be received from the remote device or may be provided by a location server in the mobile network. The location data may be automatically generated (e.g. using a GPS receiver) or may be provided by the remote device user. Alternatively, the system may be configured to receive location data from multiple remote devices at all times and to display the location information only for selected remote devices.

After receiving the location data, the system proceeds to block 508, where it displays a location indicator on the display. The location indicator may be simple, such as a flashing light, or more complicated, such as a stored picture of a person associated with the remote device.

After displaying the location indicator, the system proceeds to block 510, where it displays supplemental information. As discussed above, the supplemental information may include points of interest or other geographical information associated with a location displayed on the globe. The supplemental information component 422 generates point of interest data by accessing one or more electronic databases, such as point of interest database, encyclopedias, and/or travel guides, and providing the information to the location display component 420 to display on the display. The system may use a different indicator to show the supplemental information than the indicator for the remote device.

In block 510, the system may also display supplemental information received from the remote mobile device. The system receives the supplemental information, such as videos, images, audio, or text, from the remote device over a wireless or wired network connection. The supplemental information may be received along with an associated location or the location may be automatically generated based on the current location of the mobile device. The system then displays an indicator on the display at the associated location to show that supplemental information is available. The system may also be configured to display the information itself instead of the indicator.

After displaying the supplemental information, the system proceeds to block 512, where it receives and responds to user interaction. The user interaction may include, for example, commands directing the system to change the map display by magnifying, minimizing, or relocating the center of the map display to a different area. The user may also select a displayed indicator, such as the location indicator or a supplemental information indicator, to receive additional information associated with that indicator. For supplemental information, the user may select the indicator to display media (e.g. video, audio, images, or text) associated with the indicator.

After receiving user interaction, processing proceeds to block 514, where the system determines whether to continue its processing. This may include, for example, detecting a user command to shut down. The system may also be configured with an automatic timeout, after which the system will stop tracking a remote device. If it is determined to continue monitoring, the system returns to block 506 to receive a new remote device location. Otherwise, the system terminates the process and shuts down or enters a low power state.

Figure 6:
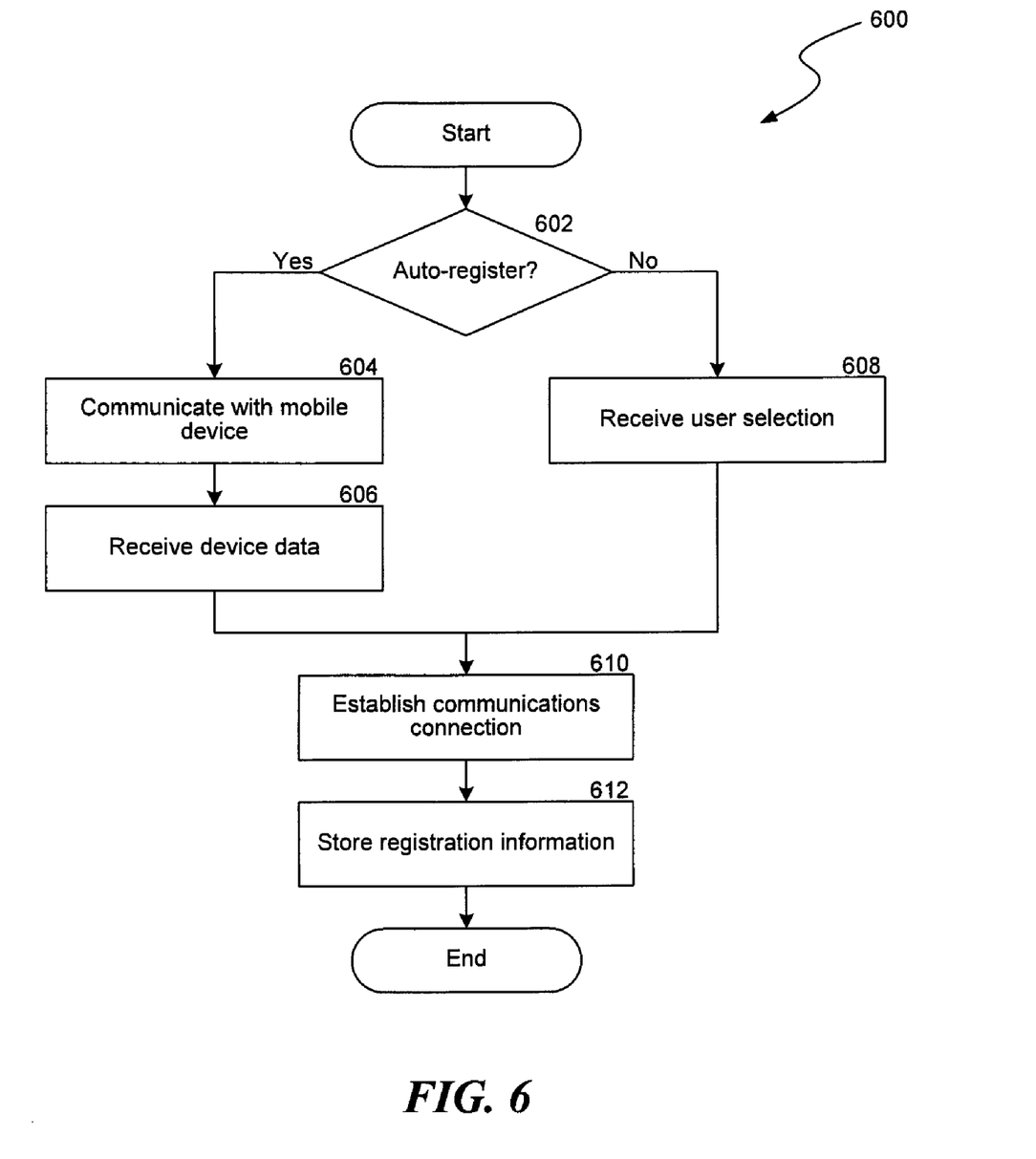
FIG. 6 is a flow chart of a process for registering a remote device to be tracked by the display system of FIG. 3.

FIG. 6 is a flow chart of a process 600 for registering a remote device to be tracked by the display system. Processing begins at block 602, where the system determines whether to automatically register a mobile device to provide location information to a display device. The system may do so by communicating directly with a device to define an association with the device. This enables a user to more easily start using the system by simplifying the process of registering a device. The system may be configured to attempt to auto-register devices in response to a user command or to automatically attempt to auto-register whenever a suitable device is within range of a local wireless connection or after receiving location information from a remote device. The display device may be further configured to communicate with a network-based contact list or address book and, if the display device is associated with a network account, auto-register a device associated with an identifier already appearing in the display device user's address book. The network-based contact list or address book may be implemented according to the system disclosed in U.S. application Ser. No. 12/345,659, entitled "SYSTEM AND METHOD FOR THE DISTRIBUTION AND USE OF PRESENCE INFORMATION," which is hereby incorporated by reference. A process similar to Bluetooth pairing may be employed, or another local wireless connection between the mobile device 114 and system 400 may be initiated through known means. The registration process may be executed by the display device or by a server provided by the mobile network, such as the data server 240 of FIG. 2.

If the mobile device will be automatically registered, processing proceeds to block 604, where the system communicates with the mobile device. As discussed above, the system may do this using various communications methods. For example, the system may communicate with a nearby mobile device using the Bluetooth connection component 406. If registration is controlled by a server, a mobile device may auto-register by communicating with the server using the mobile network. After the system has established communication with the mobile device, processing proceeds to block 606, where the system receives device data from the mobile device. The device data includes information necessary for the display system to identify data received from the device, such as an International Mobile Equipment Identity (IMEI) number or International Mobile Subscriber Identity (IMSI) number.

If the system determines not to auto-register a device, processing proceeds to block 608, where the system receives a user selection. The user selection includes information necessary for the display system to connect to the selected device, such as a telephone number.

After the system has received information defining a device to register, processing proceeds to block 610, where the mobile device establishes a communications connection with the component that will receive updates from the device (the display device 232 or the data server 240). In one configuration, the mobile device and display device employ a permission process to establish communications between the two devices. The permission process may include, for example, a hand-shaking protocol in which the display device sends an initiating message to the remote device and awaits an affirmative response from the remote device. In order to ensure privacy, the registration process may also require the remote device's user to grant permission to the display device to track the remote device. Under this example, the display device and the mobile device may communicate directly, such as over an IP network, and the mobile device locally stores geographic location data and forwards it when connected to the IP network.

Alternatively or additionally, under block 610 the wireless mobile network may perform certain registration operations with respect to the display device and mobile device. For example, if the registration process is executed by a network server (e.g. data server 240), the server may also check the mobile device's IMSI number (or other number) to ensure that the device is served by the mobile network and is authorized to provide its location data to other devices. The display device may likewise be authorized. For example, if the display device includes a GSM radio or is otherwise connected to the mobile network, the display device may first register with the mobile network by providing an IMSI or other number. The network data server 240 receives this IMSI, checks it to a list of numbers for authorized customer premises equipment, and if authorized, permits geographic location data of the mobile device to be sent to the display device.

After establishing the communications connection, processing proceeds to block 612, where the system stores information about the registration. In this step, the display device 232 or the data server 240 creates and stores a database record of the data determined from the registration process, such as the device's MSISDN, IMEI, or IMSI. The database stores the data keyed to a unique identifier associated with the device, such as the IMSI. The unique identifier can be used, for example, to authenticate geographic location data and supplemental data received from a mobile device and to link the data to a registered mobile device. When the system uses the data server 240 to forward information, the server uses the stored identifier information to determine consumer premises equipment to receive the information.

Figure 7:
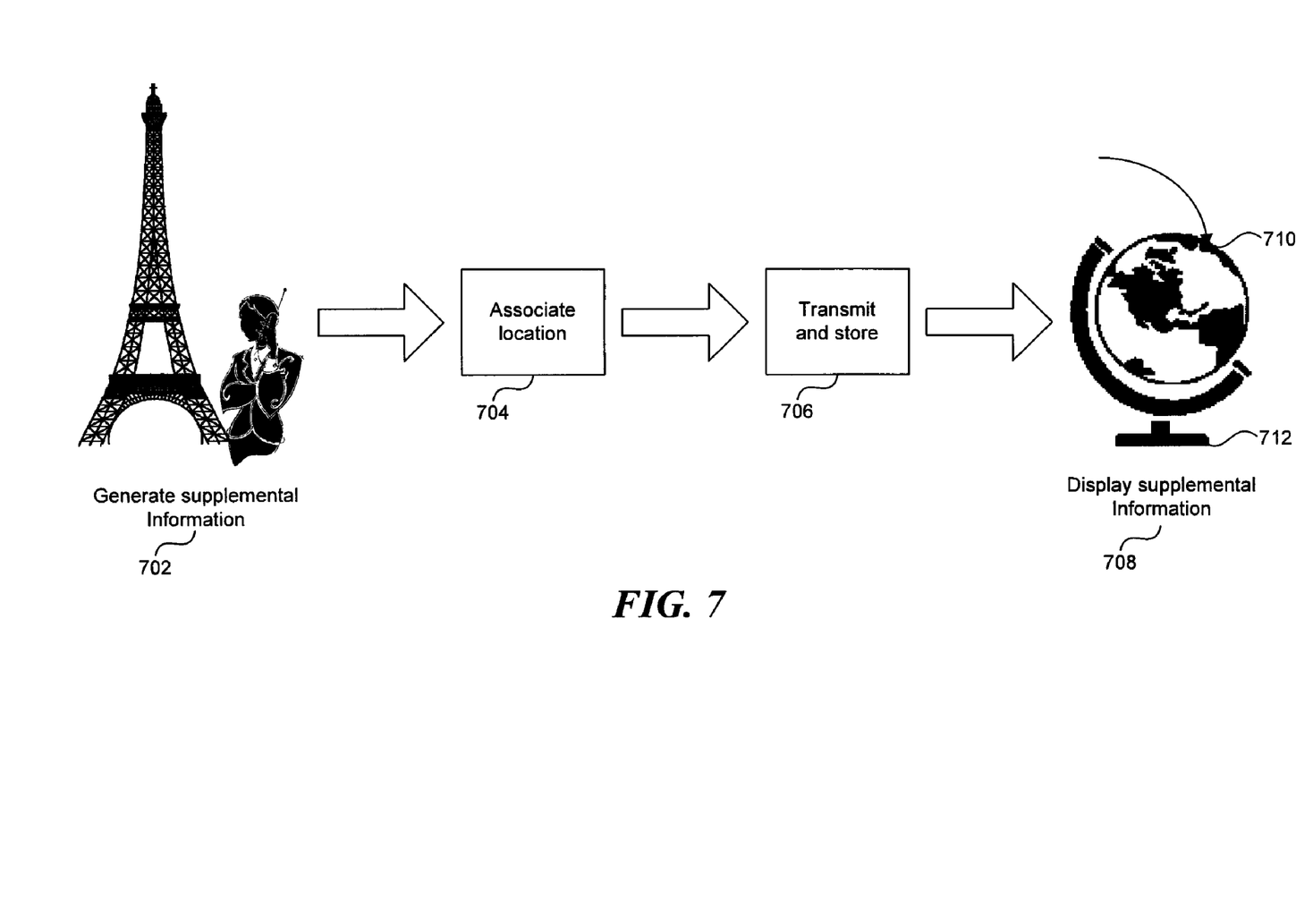
FIG. 7 is a graphical flowchart of a process for receiving supplemental information generated by the remote device.

FIG. 7 is a graphical flowchart of a process 700 for receiving supplemental information generated by the remote device. The process 700 begins at step 702, where a remote device user is shown traveling in Paris. While in Paris, the remote device user may generate one or more types of media for use as supplemental information, such as images or video of important sites. After the supplemental information is generated, the process proceeds to step 704, where the supplemental information is associated with a location. The location may be generated by the remote device using any of the location methods discussed above. For example, the remote device may include software or hardware configured to automatically determine (using GPS or other location methods) a current location at the time the supplemental information is generated. The location information may be stored separately from, but logically associated with, the supplemental information, or may be added to the supplemental information as metadata stored in or with the same file. The location data may, for example, be stored in a tag present in a digital image file, such as using the system described in U.S. application Ser. No. 12/182,952, entitled "WIRELESS DATA CAPTURE AND SHARING SYSTEM, SUCH AS IMAGE CAPTURE AND SHARING OF DIGITAL CAMERA IMAGES VIA A WIRELESS CELLULAR NETWORK AND RELATED TAGGING OF IMAGES," which is hereby incorporated by reference.

After the supplemental information is associated with a location, the process proceeds to step 706, where the supplemental information and the associated location are transmitted by the remote device and received and stored by the display system. The supplemental information may be transmitted based on a command from the remote user or the remote device may be configured to automatically transmit certain types of media. The process then proceeds to step 708, where the display system displays a supplemental information indicator 710 on the display 712. As discussed above, the location may be determined by the remote device or by a component of the mobile network. Thus, although the process 700 shows that the remote device associates the location before transmitting the supplemental information, step 704 may also be executed by the display system after it receives the supplemental information in step 706.

Figure 8A:
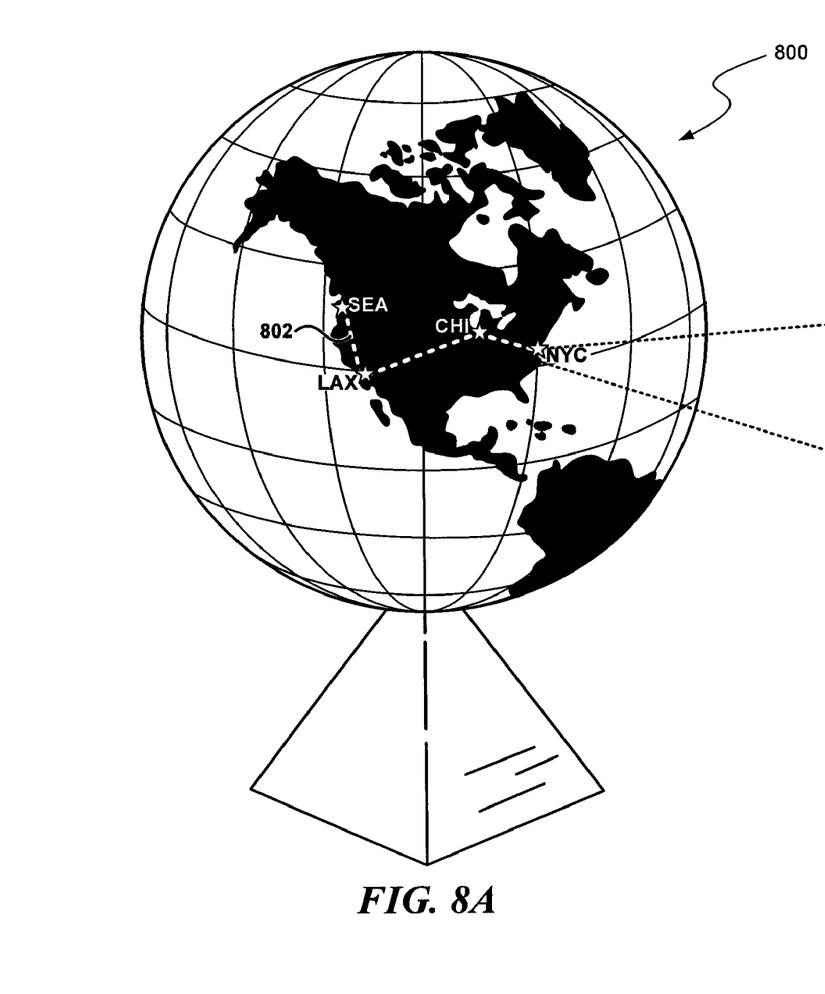
FIG. 8 shows example user interfaces of the display system of FIG. 1.
Figure 8B:
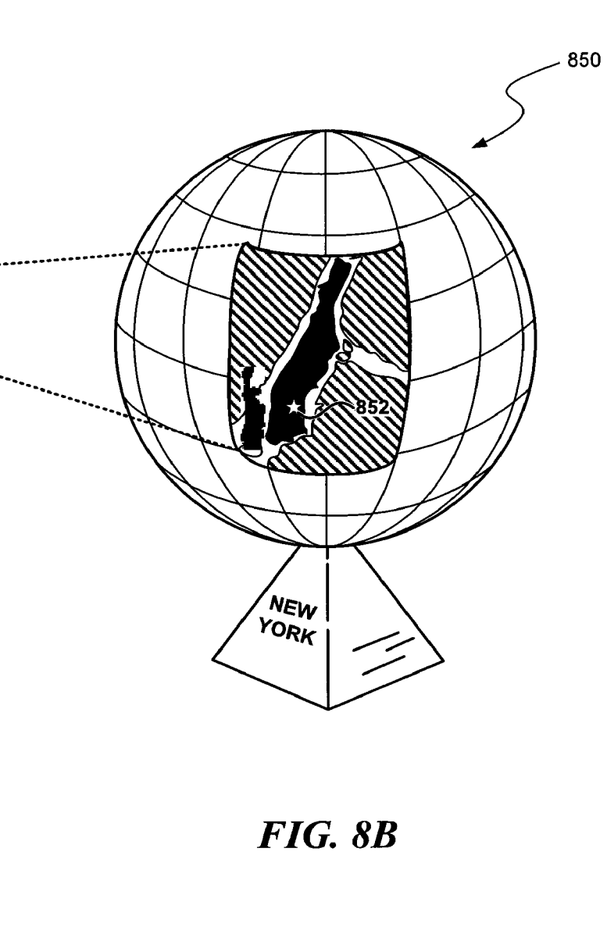

FIGS. 8A and 8B shows example user interfaces 800 and 850 of the display system. The display system may be configured to display a route traveled by a remote device over a period of time. Thus, the interface 800 shows a route display associated with a selected remote device. As shown in the figure, the interface is displaying a full world map (i.e. completely zoomed out). The interface also includes a route line 802 having three segments. The first segment begins in Seattle and ends in Los Angeles; the second segment begins in Los Angeles and ends in Chicago; and the third segment begins in Chicago and ends in New York. The display system may also be configured to simultaneously display routes traveled by multiple remote devices.

As discussed above, the user of the display system can control the map in various ways, such as magnifying, minimizing, or changing the center location. For example, the user may use magnify functionality to magnify a particular stage of the route, as shown in interface 850. Interface 850 shows that the map has been fully magnified to focus on the island of Manhattan in New York. Because the map is shown fully magnified, the display system is able to display the remote device location with greater precision. Thus, the location indicator 852 is located in the southern portion of Manhattan Island.

It would be appreciated that the design of the display system could be varied in a number of ways. For example, the system may use an alternative display configuration, such as a cylinder, a hemisphere, or any other non-flat display suitable for displaying a map in three dimensions. The system may also be configured to provide a visual indicator when new data is received. For example, this visual indicator may include pulsing the entire display to indicate that new information is available. The system could also be linked with various databases to provide supplemental information. The databases might include, for example, an encyclopedia, a travel guide, or a business directory. The system may also be configurable, so that a user could select the types of supplemental information to display at various times.

CONCLUSION

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to add additional claims after filing the application to pursue such additional claim forms for other aspects of the invention.

I claim:

1. An apparatus for receiving geographic location data and supplemental information associated with multiple mobile devices and displaying data, including the geographic location data and supplemental information, the apparatus comprising:

a display having a spherical, hemispherical, semispherical, or convex shape;

at least one touch-sensitive input component;

at least one network connection component;

a memory, wherein the memory stores geographic location data and supplemental information associated with the mobile device; and a processor coupled among the display, the at least one touch-sensitive input component, the at least one network connection component, and the memory;

wherein the processor is configured to execute various components, wherein the components comprise:

a registration component configured to register at least a first mobile device and a second mobile device, wherein registering comprises:

receiving information uniquely identifying the first mobile device and the second mobile device;

communicating with the first mobile device to exchange registration information, permission information, or both, associated with the first mobile device;

storing the registration information, the permission information, or both, associated with the first mobile device;

communicating with the second mobile device to exchange registration information, permission information, or both, associated with the second mobile device; and storing the registration information, the permission information, or both, associated with the second mobile device;

a location component configured to receive first geographic location data associated with a geographic location of the first mobile device and second geographic location data associated with a geographic location of the second mobile device through the at least one network connection component;

a supplemental information component configured to receive supplemental information data associated with the geographic location of the first mobile device, wherein the supplemental information data includes at least one of text data from the mobile device, audio data from the mobile device, digital image data from the mobile device, and video data from the mobile device;

a map display component configured to cause the display to display a map of a geographical region;

a location display component configured to cause the display to display an indicator of the first geographic location data and the second geographic location data on the map of the geographical region;

a device select component configured to receive control information and to cause the display to display the indicator of the first geographic location data and not display the indicator of the second geographic location data in response to the control information; and a supplemental information display component configured to cause the display to display the supplemental information data on the map associated with the second geographic location.

2. The apparatus of claim 1, wherein:

the map display component is further configured to magnify, minimize, or move the display of the map of the geographical region in response to a command received from a user through the at least one touch-sensitive input component.

3. The apparatus of claim 1, wherein the device selection component is further configured to select the mobile device based on settings associated with an individual user of multiple users.

4. The apparatus of claim 1, wherein the supplemental information data further comprises at least one of text data, audio data, digital image data, and video data associated with points of interest in the geographical area near at least one of the first geographic location and the second geographic location.

5. The apparatus of claim 1, wherein the first mobile device and the second mobile device are connected to a mobile wireless network and the at least one network connection component includes a wireless network adapter configured to connect to the mobile wireless network.

6. A method for receiving geographic location data associated with geographic locations of a first mobile device and a second mobile device and displaying data, including the geographic location data, the method comprising:
- registering at least a first mobile device and a second mobile device, wherein registering comprises:
  - receiving information uniquely identifying the first mobile device and the second mobile device;
  - communicating with the first mobile device to exchange registration information, permission information, or both, associated with the first mobile device;
  - storing the registration information, the permission information, or both, associated with the first mobile device;
  - communicating with the second mobile device to exchange registration information, permission information, or both, associated with the second mobile device; and
  - storing the registration information, the permission information, or both, associated with the second mobile device;
- displaying a three dimensional map of a geographical region, wherein the three dimensional map of a geographical region is displayed as a spherical, hemispherical, semispherical, or convex display;
- receiving first geographic location data associated with a geographic location of the first mobile device;
- receiving second geographic location data associated with a geographic location of the second mobile device;
- displaying an indication of the first geographic location data on the three dimensional map;
- displaying an indication of the second geographic location data on the three dimensional map;
- receiving control information; and
- displaying the indication of the first geographical location and not displaying the indication of the second geographical location in response to the received control information.

7. The method of claim 6, further comprising displaying a route traveled by the first mobile device based on the received first geographic location data.

8. The method of claim 6, wherein storing the registration information further comprises sending registration information to a data server and wherein the geographic location data associated with the geographic location of the selected first mobile device is received from the data server.

9. The method of claim 6, further comprising displaying an indicator of one or more points of interest on the three dimensional map in the geographical area nearby the indication of the geographic location of the first mobile device.

10. The method of claim 6, further comprising:
- receiving media data from the first mobile device, wherein the received media data is one of: text data, video data, image data, or audio data;
- associating the received media data with a specified geographic location, wherein the specified geographic location is the location of the first mobile device; and
- displaying the received media data on the three-dimensional map.

11. The method of claim 6, further comprising displaying on the three dimensional map a visual indication after receiving geographic location data to indicate a display update based on newly received geographic location data.

12. The method of claim 6, wherein permission information comprises data provided by the first mobile device or the second mobile device indicating that a user has granted permission for the device to provide geographical location data.

13. The method of claim 6, wherein registration information comprises data provided by the first mobile device or the second mobile device usable to identify communications received from the mobile device.

14. The method of claim 6, wherein the information uniquely identifying the first mobile device is received by direct communications with the first mobile device using a wireless connection.

15. The method of claim 6, wherein the information uniquely identifying the first mobile device is received from a user entering the information through an input device.

16. An apparatus comprising:
- an input means for receiving commands from a user;
- a display means for displaying a map and one or more geographic location indicators, wherein the display means provides a non-flat display;
- a network connection means for receiving data from a data network;
- a memory means for storing data;
- a processor means for executing one or more components comprising:
  - a registration component configured to register at least a first mobile device and a second mobile device, wherein registering comprises:
    - receiving information uniquely identifying the first mobile device and the second mobile device;
    - communicating with the first mobile device to exchange registration information, permission information, or both, associated with the first mobile device, wherein the permission information comprises data provided by the first mobile device or the second mobile device indicating that a user has granted permission for the device to provide geographical location data;
    - storing the registration information, the permission information, or both, associated with the first mobile device;
    - communicating with the second mobile device to exchange registration information, permission information, or both, associated with the second mobile device; and
    - storing the registration information, the permission information, or both, associated with the second mobile device;
  - a location component configured to receive first geographic location data associated with a geographic location of the first mobile device and second geographic location data associated with a geographic location of the second mobile device through the network connection means;

a map display component configured to cause the display means to display a map of a geographical region; and a location mapping component configured to cause the display means to display an indication of the first geographic location data and the second geographic location data.

17. The apparatus of claim 16, wherein the map display component is further configured to cause the display means to display a route traveled by the first mobile device based on the received first geographic location data and to magnify or minimize the map of the geographical region in response to a command received from the input means.

18. The apparatus of claim 16, further comprising:
a local communications means for communicating with the first mobile device;
wherein the registration component is configured to receive the registration information from the first mobile device via the local communications means.

19. The apparatus of claim 18, wherein the registration information comprises data provided by the first mobile device usable to identify communications received from the first mobile device.

20. The apparatus of claim 16, wherein the processor means is further configured to execute a supplemental information component configured to cause the display means to display one or more points of interest in the geographical area near the first mobile device.

21. The apparatus of claim 16, wherein the processor means is further configured to execute:
a supplemental information component configured to receive media data comprising at least one of video data, audio data, image data, or text data from the first mobile device and associate the received media data with the geographic location of the first mobile device; and
a supplemental information display component configured to cause the display means to display the received media data at the associated geographic location.

22. An apparatus for providing geographic location data to customer premises equipment, wherein the geographic location data is associated with geographic locations of selected wireless mobile devices operating within at least one wireless network, the apparatus comprising:
a database for storing geographic location data associated with selected wireless mobile devices;
at least one network connection component;
a server computer coupled among the at least one network connection component and the database;
wherein the server computer is configured to execute various components, the components including:
a registration component configured to register at least a first mobile device and a second mobile device, wherein registering comprises:
receiving information uniquely identifying the first mobile device and the second mobile device;
communicating with the first mobile device to exchange registration information, permission information, or both, associated with the first mobile device, wherein registration information comprises data provided by the first mobile device or the second mobile device usable to identify communications received from the mobile device;
storing the registration information, the permission information, or both, associated with the first mobile device;
communicating with the second mobile device to exchange registration information, permission information, or both, associated with the second mobile device; and
storing the registration information, the permission information, or both, associated with the second mobile device;
a location component configured to receive first geographic location data associated with a geographic location of the first mobile device and second geographic location data associated with a geographic location of the second mobile device through the network connection component;
a supplemental information component configured to receive at least a first supplemental information provided by the first mobile device;
an authentication component configured to authenticate forwarding of geographic location data from the first mobile device and the second mobile device to the customer premises equipment; and
a data forwarding component configured to provide, via the network connection component, the first geographic location data, the second geographic location data, and the first supplemental information to the customer premises equipment after the authentication component authenticates forwarding of geographic location data from the first mobile device and the second mobile device to the customer premises equipment,
wherein the customer premises equipment is configured to provide at least the first geographic location data and the second geographic location data with map data on a display device having a spherical or hemispherical shape.

23. The apparatus of claim 22, wherein the supplemental information comprises one or more points of interest in the geographical area near the mobile device.

24. The apparatus of claim 22, wherein the supplemental information component is configured to receive media data comprising at least one of video data, audio data, image data, or text data from the mobile device, associate the received media data with a second geographic location, and display the received media data on the display device, wherein the second geographic location is a previous geographic location of the mobile device.

25. The apparatus of claim 22, wherein the location component is further configured to cause the display device to display a new data indication after receiving the geographic location data to indicate a display update based on newly received geographic location data.

26. A method for receiving geographic location data associated with geographic locations of a first mobile device and a second mobile device and displaying data, including the geographic location data, the method comprising:
registering at least a first mobile device and a second mobile device, wherein registering comprises:
receiving information uniquely identifying the first mobile device and the second mobile device;
communicating with the first mobile device to exchange registration information, permission information, or both, associated with the first mobile device,
wherein permission information comprises data provided by the first mobile device or the second mobile device indicating that a user has granted permission for the device to provide geographical location data;

storing the registration information, the permission information, or both, associated with the first mobile device;
communicating with the second mobile device to exchange registration information, permission information, or both, associated with the second mobile device; and
storing the registration information, the permission information, or both, associated with the second mobile device;
displaying a three dimensional map of a geographical region, wherein the three dimensional map of a geographical region is displayed as a spherical, hemispherical, semispherical, or convex display;
receiving first geographic location data associated with a geographic location of the first mobile device;
receiving second geographic location data associated with a geographic location of the second mobile device;
displaying an indication of the first geographic location data on the three dimensional map;
displaying an indication of the second geographic location data on the three dimensional map.

27. A method for receiving geographic location data associated with geographic locations of a first mobile device and a second mobile device and displaying data, including the geographic location data, the method comprising:
registering at least a first mobile device and a second mobile device, wherein registering comprises:
receiving information uniquely identifying the first mobile device and the second mobile device;
communicating with the first mobile device to exchange registration information, permission information, or both, associated with the first mobile device,
wherein registration information comprises data provided by the first mobile device or the second mobile device usable to identify communications received from the mobile device;
storing the registration information, the permission information, or both, associated with the first mobile device;
communicating with the second mobile device to exchange registration information, permission information, or both, associated with the second mobile device; and
storing the registration information, the permission information, or both, associated with the second mobile device;
displaying a three dimensional map of a geographical region, wherein the three dimensional map of a geographical region is displayed as a spherical, hemispherical, semispherical, or convex display;
receiving first geographic location data associated with a geographic location of the first mobile device;
receiving second geographic location data associated with a geographic location of the second mobile device;
displaying an indication of the first geographic location data on the three dimensional map;
displaying an indication of the second geographic location data on the three dimensional map.

* * * * *